Figure 1:
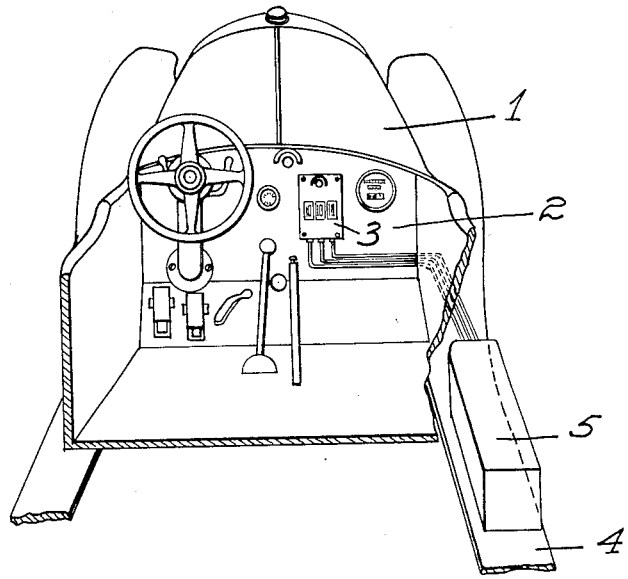

W. A. CASE.
TESTING APPARATUS FOR BATTERY CELLS.
APPLICATION FILED SEPT. 3, 1919.

1,358,827.

Patented Nov. 16, 1920.
2 SHEETS—SHEET 1.

INVENTOR.
William A. Case
BY
ATTORNEY.

W. A. CASE.
TESTING APPARATUS FOR BATTERY CELLS.
APPLICATION FILED SEPT. 3, 1919.

1,358,827.

Patented Nov. 16, 1920.
2 SHEETS—SHEET 2.

INVENTOR.
William A. Case
BY
ATTORNEY.

UNITED STATES PATENT OFFICE.

WILLIAM A. CASE, OF PLAINFIELD, NEW JERSEY, ASSIGNOR OF TWO-THIRDS TO SIMON GOTTSCHALL, OF NEW YORK, N. Y., AND ONE-THIRD TO EICHENGRAN SALES CORPORATION, OF NEW YORK, N. Y., A CORPORATION OF NEW YORK.

TESTING APPARATUS FOR BATTERY-CELLS.

1,358,827.     Specification of Letters Patent.     Patented Nov. 16, 1920.

Application filed September 3, 1919. Serial No. 321,356.

*To all whom it may concern:*

Be it known that I, WILLIAM A. CASE, citizen of the United States, residing at 411 East 7th street, Plainfield, in the county of Union, State of New Jersey, have invented certain new and useful Improvements in Testing Apparatus for Battery-Cells; and I do hereby declare the following to be a full, clear, and exact description of the invention, such as will enable others skilled in the art to which it appertains to make and use the same.

The present invention relates to testing apparatus for a battery of one or more cells, and particularly to such apparatus for testing the specific gravity, temperature and level of the electrolyte of the individual cells at a place remote from the battery as, for instance, on the dashboard or running-board of an automobile.

As is well known, one or more cells of a storage battery may become discharged or require replenishing with water or acid while other cells are still in operative condition, although the cells are electrically connected to the same charging and working circuit. Thus, a test of one cell may be entirely misleading as to the condition of the other cells of the same battery, so that when such tests were made heretofore, it was usual to first uncover or remove the battery and to then open each cell individually to determine the level and specific gravity of the electrolyte therein. This procedure is usually so inconvenient that under ordinary circumstances the battery is not given the care required for its efficient operation and maintenance, with the result that the plates of one or more of the cells soon become warped, sulfated or disintegrated, and finally destroy the usefulness of the entire battery after unusually brief service.

The object of my invention is to overcome the foregoing difficulties in a simple manner and thereby enable the operator of the moving vehicle to more reliably and speedily ascertain the condition of the individual cells of the battery, so that any injurious action proceeding in any one or more of the cells may be readily discovered and remedied before progressing too far.

In accordance with my invention, I provide a tube leading out from each of the cells and extending either to a container for a hydrometer, and for a thermometer also, if desired, or else to a valve which is adapted to establish communication between each of the tubes in turn and a single container having a single hydrometer, and a thermometer, if desired; each of the containers in the first case, or the single container in the latter case, having means, such as a collapsible bulb of rubber or other suitable material, for drawing electrolyte from the cell into the container, and forcing it back thereinto after the test is made. Where a rubber bulb is used, as hereinafter described, a spring is arranged to permit distension of the bulb, when a test is desired, to suck the electrolyte into the container, and is also adapted to collapse the bulb, when the test is completed, to force the electrolyte from the container back into the cell from which it came, the spring normally allowing the bulb to assume a distended condition, but being provided with means, such as a latch, for holding the bulb in collapsed condition during the testing period. Furthermore, where more than one bulb is provided, a single operating device may be provided to collapse all of them simultaneously and to allow all of them to distend simultaneously, so that the test on all the individual cells may be made simultaneously. With this arrangement the container or containers may be mounted at any convenient place remote from the battery, so that the specific gravity of the electrolyte may be conveniently read. Furthermore, the level of the electrolyte in the cell may be readily ascertained at the same time by noting the height to which the electrolyte rises in the container, and by arranging a thermometer in the container, the operator may readily determine at will the specific gravity of the electrolyte of each cell at the temperature indicated by the thermometer, and thereby ascertain the true condition of the cell. By noting the level of the electrolyte, the operator is advised at the same time of the requirement for water, acid or electrolyte, as the case may be.

Figure 2:
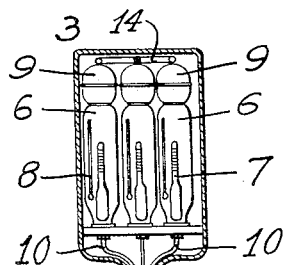
Figure 2:
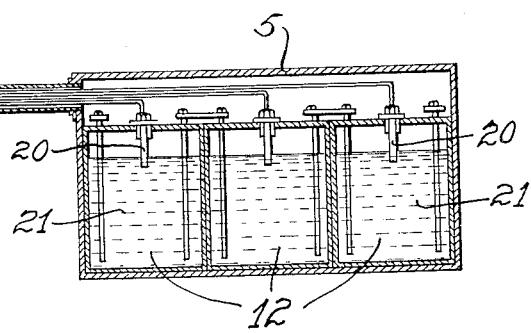
Figure 3:
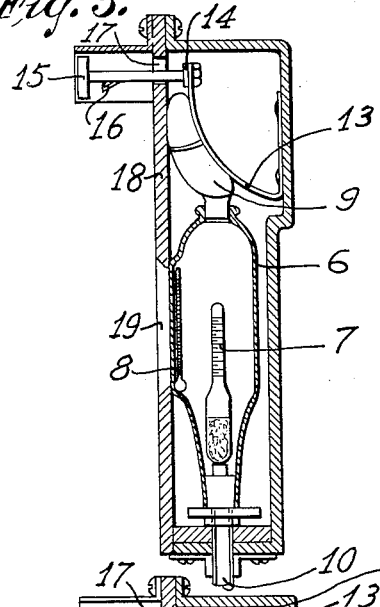
Figure 5:
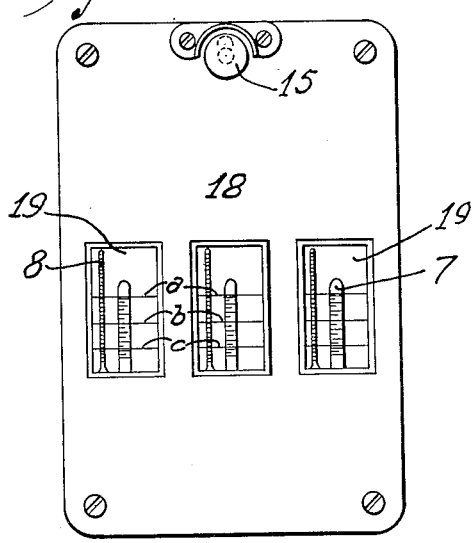
Figure 4:
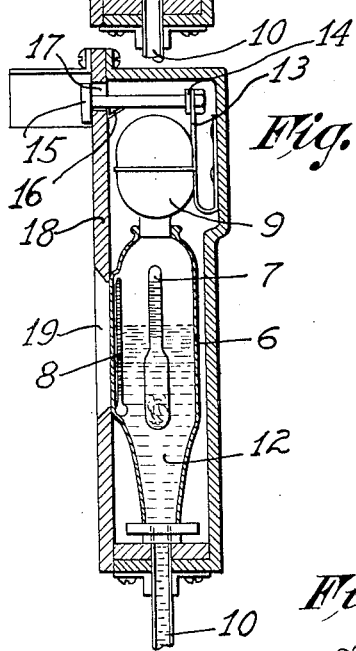
Figure 6:
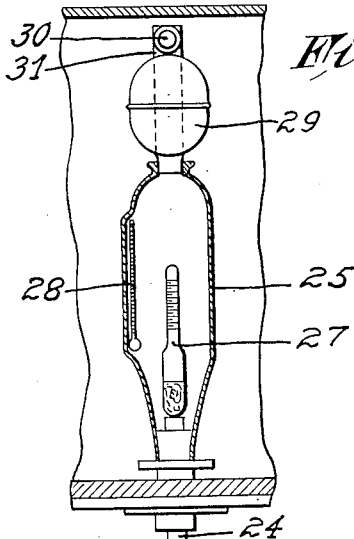
Figure 7:
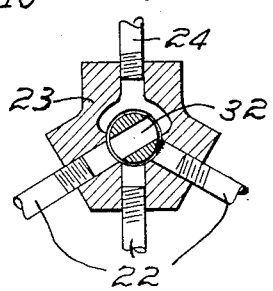

In the accompanying drawings illustrating several embodiments within my invention, in application, as an example, to a storage battery of three cells on an automobile, Figure 1 is a perspective view, partly broken away, showing the testing apparatus on the dashboard connected by tubes to the battery on the running-board; Fig. 2 is an enlarged sectional view of the testing apparatus alone; Fig. 3 is a still more enlarged view of the container with the bulb in collapsed condition; Fig. 4 is a similar view with the bulb in distended condition; Fig. 5 is a front view of the testing panel; Fig. 6 represents a modified arrangement in which a single container with bulb is used for three battery cells; and Fig. 7 is a detail of the distributing valve therefor.

Referring to the first embodiment shown in Figs. 1 to 5, the automobile 1 has a dashboard 2 on which the testing apparatus 3 is fastened, and a running-board 4 on which is located a battery 5 for supplying current for lighting and starting purposes, and for ignition purposes also, if desired. The testing apparatus includes three containers 6 of clear glass, each containing a hydrometer 7, and a thermometer 8 which is suitably held in place in the container. Communicating with the top of each container is a collapsible bulb 9 of soft rubber, and communicating with the bottom of each container is a flexible tube 10 of soft rubber extending through the flexible armored cable 11 to an individual one of the three cells 12 of the battery.

For each bulb 9 there is a bent leaf spring 13 fastened to a cross-bar 14 and arranged, when forced back, to allow the bulb to assume a fully distended condition as shown in Fig. 4, but, when free, to collapse the bulb as shown in Fig. 3. The push button 15 extends forwardly for convenient operation, and has a detent 16 adapted to latch behind the panel board 18 to permit all the bulbs to assume their distended condition. The openings 17 in the panel board are of such height that the push button may be raised sufficiently to clear the detent 16 when the push button is raised. The panel board has three windows 19 through which the hydrometers and thermometers, and also the three level lines a, b, c of the three containers are visible.

The ends of the tubes 10 are fastened in an air-tight manner to the tubes 20 projecting the required amount below the normal level of the electrolyte 21 of the cells 12. Likewise the tubes 10 are connected to the bottom of the containers and the bulbs are connected to the tops thereof in an air-tight manner, so that there is substantially no leakage of air from the outside into the testing apparatus.

Normally the push button 15 has the projected position shown in Fig. 3. To test the cells, the push button 15 is depressed until the detent 16 is latched behind the panel board, whereupon the three bulbs 9 simultaneously assume their distended condition and draw electrolyte from the cells into the respective containers, floating the hydrometers and immersing the thermometers. The specific gravity of the electrolyte from the three cells may then be read separately, and also the temperature, so that the operator is advised of the true condition of the individual cells. After the readings have been taken, the push button 15 is elevated so as to release the detent 16 and force the bulbs to collapsed condition, whereupon the separate quantities of electrolyte are forced back into the respective cells 12.

In case the electrolyte in any cell is below its normal level therein, it will not rise in its container to the line a. If it rises only to line b, it furnishes a warning that the electrolyte should soon be replenished; or if it rises only to line c, then the operator is advised that the electrolyte should be replenished immediately, the hydrometric and thermometric readings furnishing the necessary information to the tester that either water or acid, or both, should be supplied to the cell.

In the second embodiment illustrated in Figs. 6 and 7, the three tubes extend from the respective cells to the inlets 22 of the valve 23, which has a single outlet 24 extending to a single container 25, and an operating handle 26. This container is provided with a hydrometer 27, a thermometer 28, and a rubber bulb 29. The push button 30 is connected to a single spring 31 for collapsing the bulb and permitting it to assume its distended condition.

It is obvious that by turning the handle so that the opening 32 registers with each of the inlets 22 in turn, the specific gravity and temperature of the electrolyte of each of the cells may be read individually, and an indication of the level of the electrolyte in the cell may be ascertained.

It is obvious that the testing apparatus disclosed herein may be located at any convenient place remote from the battery, and that the true condition of the electrolyte of each cell, no matter how many the battery has, may be determined readily and conveniently. Furthermore, the apparatus is simple and inexpensive and may be attached to any portable battery located at any place on a moving vehicle, or to any stationary battery.

Having thus described my invention, what I claim is:

1. The combination with a battery cell, of apparatus for testing the cell at a place remote therefrom, comprising a container having a transparent portion, a tube communicating with the cell and container, a hydrometer inclosed within the container and visible through said transparent portion, a collapsible bulb which is in communication with the container and which forces the electrolyte from the container back into the cell, and means tending to hold the bulb in condition to force the electrolyte from the container into the cell.

2. The combination with a battery cell, of apparatus for testing the cell at a place remote therefrom, comprising a container having a transparent portion, a tube communicating with the cell and container, a hydrometer inclosed within the container and visible through said transparent portion, a collapsible bulb which is in communication with the container and which draws electrolyte from the cell into the container and forces the electrolyte from the container back into the cell, and means tending to hold the bulb in collapsed condition.

3. The combination with a battery cell, of apparatus for testing the cell at a place remote therefrom, comprising a container having a transparent portion, a tube communicating with the cell and container, a hydrometer inclosed within the container and visible through said transparent portion, a collapsible bulb which is in communication with the container and which draws electrolyte from the cell into the container and forces the electrolyte from the container back into the cell, a spring tending to collapse the bulb, and means for holding the spring in such position that the bulb is distended.

4. The combination with a battery consisting of a plurality of cells, of apparatus for testing the cells individually at a place remote therefrom, comprising containers for respective cells, tubes communicating with respective containers and cells, a hydrometer in each container, collapsible bulbs in communication with the respective containers, and a single operating device for collapsing the bulbs simultaneously and for subsequently allowing the bulbs to distend simultaneously.

5. The combination with a battery consisting of a plurality of cells, of apparatus for testing the cells individually at a place remote therefrom, comprising containers for respective cells, tubes communicating with the respective containers and cells, a hydrometer in each container, collapsible bulbs in communication with the respective containers, a spring tending to collapse the bulbs simultaneously and for allowing them to distend simultaneously, and means for holding the spring in such position that the bulbs are distended.

6. The combination with a moving vehicle and a battery cell mounted thereon, of apparatus for testing the cell, comprising a container mounted on the dashboard and having a transparent portion, a tube communicating with the cell and container, a hydrometer inclosed within the container and visible through said transparent portion, a collapsible bulb which is in communication with the container and which is adapted to draw electrolyte from the cell into the container and force the electrolyte from the container back into the cell, and means for holding the bulb in condition to force the electrolyte from the container into the cell.

In testimony whereof I affix my signature.

WILLIAM A. CASE.